(No Model.) 2 Sheets—Sheet 2.

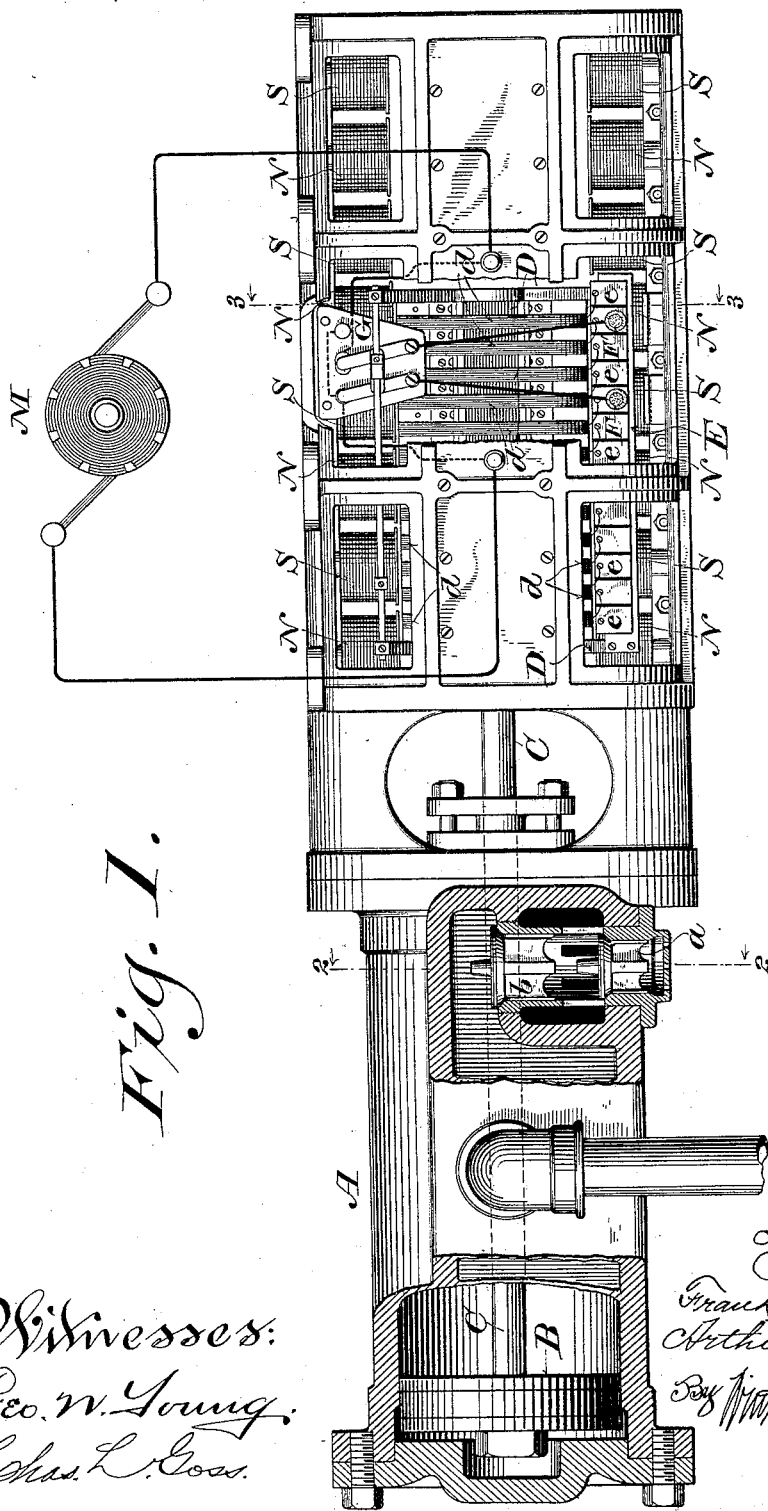

F. W. MERRITT & A. R. ROE.
ELECTRIC PUMP.

No. 524,044. Patented Aug. 7, 1894.

Witnesses:
Geo. W. Young.
Chas. L. Goss.

Inventors:
Frank W. Merritt,
Arthur R. Roe
By Winkler Flanders Smith Bottum Vilas
Attorneys.

UNITED STATES PATENT OFFICE.

FRANK. W. MERRITT AND ARTHUR R. ROE, OF DULUTH, MINNESOTA, ASSIGNORS TO THE ELECTRIC MOTOR COMPANY, OF SAME PLACE.

ELECTRIC PUMP.

SPECIFICATION forming part of Letters Patent No. 524,044, dated August 7, 1894.

Application filed November 6, 1893. Serial No. 490,071. (No model.)

*To all whom it may concern:*

Be it known that we, FRANK. W. MERRITT and ARTHUR R. ROE, of Duluth, in the county of St. Louis and State of Minnesota, have invented certain new and useful Improvements in Electric Pumps; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of our invention is to produce a direct acting reciprocating electric pump, and it consists essentially in the adaptation of an electric motor to a pump of this class, as hereinafter particularly described and pointed out in the claim.

In the accompanying drawings like letters designate the same parts in the several figures.

Figure 3:
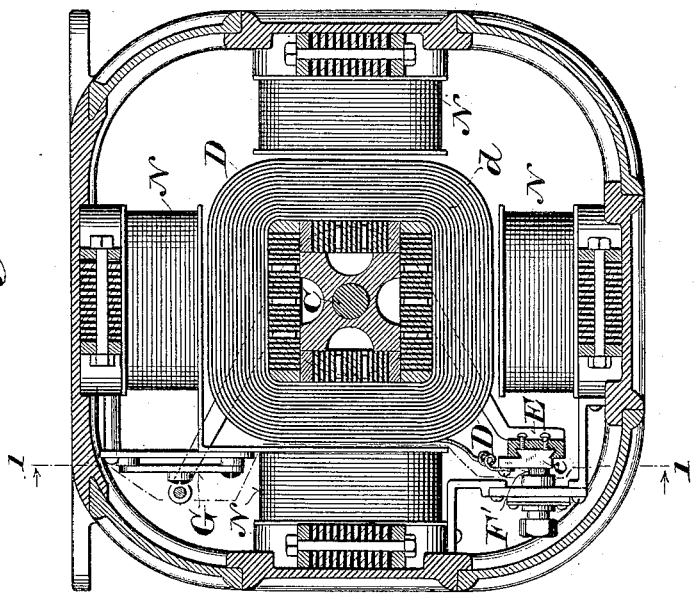
Figure 2:
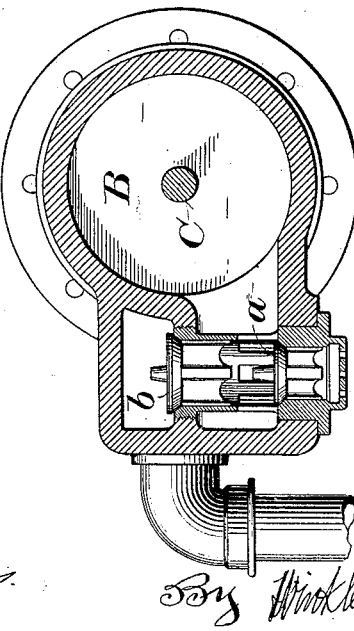

Figure 1 is a side elevation of our improved pump, certain portions of the pump cylinder and valve cases being broken away to disclose the internal mechanism thereof, and a portion of the motor being shown in vertical section on the line 1, 1, Fig. 3. Fig. 2 is a vertical cross section of the pump cylinder on the line 2, 2, Fig. 1; and Fig. 3 is a like section of the motor on the line 3, 3, Fig. 1.

A is the cylinder, B the piston and C the piston rod of a reciprocating air pump or compressor.

$a$ represents one of the suction valves and $b$ one of the force valves, which are duplicated at the opposite end of the pump cylinder.

Although for convenience of illustration we have shown our invention in connection with an air pump or compressor, it is equally applicable to reciprocating pumps for other purposes.

D is a straight bar armature attached directly to the piston rod C and provided in the direction of its length with a number of coils $d\ d$.

E is the commutator carried by the armature and comprising a series of insulated contact plates $e\ e$, arranged parallel with the axis of the motor.

F F' are the brushes, arranged to bear upon the commutator plates and connected by suitable conductors with an electric generator M, or other source of electricity.

The armature D is arranged to reciprocate in the field of one or more series of magnets N S, N S, arranged parallel with the axis of the armature and of alternately opposite polarity, as indicated by the reference letters.

G is a switch arranged to be operated by the movement of the armature to reverse the direction of the current at the end of each stroke of the armature, through the armature coils as shown, or through the field coils.

The armature coils $d\ d$ are severally connected with the corresponding commutator plates $e\ e$, and the brushes F F' are set at a distance from each other corresponding approximately with the distance between the poles of adjacent field magnets. There are a number of armature coils to each length of the armature corresponding with the distance between the adjacent field magnet poles. By this construction of the motor a steady uniform reciprocating movement is given to the armature which imparts a like stroke to the pump piston.

Various changes in the minor details of construction and arrangement of the component parts of the pump and motor may be made within the intended spirit of our invention.

We claim—

The combination of a pump cylinder provided with a reciprocating piston, a bar armature attached directly to the piston rod and provided in the direction of its length with a number of coils, a commutator carried by said armature and consisting of a series of insulated contact plates arranged parallel with the axis of the armature and connected with corresponding coils thereof, a series of field magnets of alternately opposite polarity arranged parallel with the movement of the armature, and a switch arranged to reverse the current through the field or armature coils at the end of each stroke of the armature, substantially as and for the purposes set forth.

In testimony that we claim the foregoing as our own we affix our signatures in presence of two witnesses.

FRANK. W. MERRITT.
ARTHUR R. ROE.

Witnesses:
CHAS. A. TOWNE,
ELLSWORTH BENHAM.